United States Patent [19]
Dahringer et al.

[11] Patent Number: 5,726,107
[45] Date of Patent: Mar. 10, 1998

[54] NON-WOVENS OF ELECTRET FIBER MIXTURES HAVING AN IMPROVED CHARGE STABILITY

[75] Inventors: Jörg Dahringer; Ernst-August Albers, both of Bobingen; Werner Groh, Schwabmünchen; Achim Heyer, Hattersheim, all of Germany

[73] Assignee: Hoechst Aktiengesellschaft, Germany

[21] Appl. No.: 520,014

[22] Filed: Aug. 28, 1995

[30] Foreign Application Priority Data

Aug. 30, 1994 [DE] Germany .................. 9414040 U

[51] Int. Cl.$^6$ ........................................ A47K 7/02
[52] U.S. Cl. ............ 442/414; 15/209.1; 55/DIG. 39; 307/400; 442/402; 442/416; 442/364
[58] Field of Search ........................ 428/288, 224; 55/155, DIG. 39; 442/364, 411, 414, 416, 402; 307/400; 15/209.1

[56] References Cited

U.S. PATENT DOCUMENTS 4,789,504  12/1988  Ohmori et al. .
5,057,710  10/1991  Nishiura et al. .

FOREIGN PATENT DOCUMENTS 0 375 781    7/1990  European Pat. Off. .
0 615 007 A1 9/1994  European Pat. Off. .
0 615 007A1  9/1994  European Pat. Off. .
3509857 A1   9/1985  Germany .

OTHER PUBLICATIONS

Bierman, Evaluation of permanently charged electrofibrous filters, 17, DOE Nuclear Air Cleaning Conference, Denver, USA (1982).
Journal of Electrostatics, 24 (1990) S. 283–293.
JP-A-05 068 823 (Toray Ind Inc), 23 Marz 1993.

Primary Examiner—James J. Bell
Attorney, Agent, or Firm—Connolly & Hutz

[57] ABSTRACT

A non-wovens fabric of electret fibers having an improved charge stability and comprising materials which chiefly comprise a fiber-forming addition or condensation polymer and 0.01 to 30% by weight (preferably 0.01 to 10, in particular 0.1 to 5, % by weight), based on the weight of the material, of organic or organometallic charge control agents, wherein the non-woven fabric comprises at least two types of electret fiber which are made of different materials which differ from one another in that they comprise different fiber-forming addition or condensation polymers and if appropriate also different charge control agents is described.

16 Claims, No Drawings

NON-WOVENS OF ELECTRET FIBER MIXTURES HAVING AN IMPROVED CHARGE STABILITY

Non-wovens of electret fiber mixtures having an improved charge stability, processes for their preparation and their use.

DESCRIPTION

The present invention relates to non-wovens of mixtures of at least two types of electret fibers, which have a considerably improved charge stability and charge development, their preparation and their use for the production of dust filters and dust cloths.

Electret fibers in the context of this invention are fibers of electrically non-conductive materials which are capable of storing an electrostatic charge which has been applied for a relatively long period of time.

Electret fibers have so far chiefly been described in connection with the problem of fine dust filtration (for example by Biermann, "Evaluation of permanently charged electrofibrous filters", 17th DOE Nuclear Air Cleaning Conference, Denver, USA, (1982)).

The various filter materials described to date differ both in respect of the materials of which the fibers are made and in respect of the manner in which the electro-static charge is applied to the fibers.

The electrostatic charge can be applied by various methods. It is thus possible for polymer films to be electrostatically charged differently on both sides and then to be split. So-called split film fibers, which are as a rule laid down as a fibrous non-woven, are thereby obtained.

It is furthermore known to carry out spinning into a strong electrostatic field or to expose the spun fibers or fiber products, for example non-wovens, to an electrical coronary discharge, for example between high-voltage points or wires and flat earthed electrodes.

Charging by triboelectric effects, i.e. charge separation by rubbing the fiber materials with other media, for example other polymer materials, solid bodies, such as metal surfaces, or also liquid or gaseous media, is particularly advantageous.

Various fiber raw materials have been investigated to date and recommended for the preparation of electret fibers having advantageous electret properties, such as long-lasting charge stability and resistance to moisture and chemicals. These advantageous properties are also to be achieved at the lowest possible cost. Fluorine polymers, such as polytetrafluoroethylene or perfluorinated ethylene/propylene copolymers, have proved to be very good electret materials here, combining a high charge stability, characterized by a charge half-life (charge duration) of years to decades, with a good heat stability and low absorption of moisture.

However, serious disadvantages of these polymers, such as their high price and the great difficulties of their processing, have largely prevented their use.

Electret fibers of polyolefins, such as polyethylene and polypropylene, or of polycarbonates also have a good resistance to chemicals and moisture. Commercially available fine dust filters are made of these electret materials. A serious disadvantage of these fibers is the relatively short charge half-life, which is only of the order of about one year. This is as a rule too short a period, considering that, for example, when the fibers are employed for filter production, the time between preparation of the fibers and use of the filter plus the filter life can easily be more than one year.

As soon as electret fibers were recommended and used for the production of fine dust filters, there was a constant urgent need to discover fiber materials which combine reasonable price with a significantly improved charge stability, resistance to moisture and chemicals, and good textile and mechanical properties, and proposals in this respect have also already been disclosed.

U.S. Pat. No. 4,789,504 recommends increasing the effectiveness of polypropylene electret filters by adding a fatty acid salt to the polymer material.

It is known from Journal of Electrostatics, 24 (1990) pages 283–293 that the temperature at which the charge density of a polyacrylate electret drops to half under standardized measurement conditions increases from 126° to 180° C. if about 10% by weight of titanium dioxide is added to the polymer. However, as well as a deterioration in the mechanical properties, this addition results in an increased sensitivity to moisture, which impedes use in filter materials.

European Patent Application No. 94 103 273.2 has also already proposed production of non-wovens and dust filters from fibers which, because of a content of charge control agents, have excellent textile properties and a considerably prolonged half-life of the electric charge, i.e. a considerably improved charge stability.

The electret fibers of improved charge stability employed there are made of a material which chiefly comprises a fiber-forming addition or condensation polymer and 0.01 to 30% by weight (preferably 0.01 to 10, in particular 0.1 to 5% by weight), based on the weight of the material, of organic or organometallic charge control agents.

These non-wovens can of course be employed with particular advantage for the production of highly effective and long-life dust filters.

It has now been found, surprisingly, that it is possible for the charge stability and charge development of electret fiber non-wovens to be further improved significantly and/or to reduce the cost without losses in filter efficiency if the electret fiber non-woven comprises a mixture of at least two types of electret fibers which are made of different materials.

The present invention thus relates to a non-woven of electret fibers having an improved charge stability and charge development, comprising materials which chiefly comprise a fiber-forming addition or condensation polymer and 0.01 to 30% by weight (preferably 0.01 to 10, in particular 0.1 to 5% by weight), based on the weight of the material, of organic or organometallic charge control agents, wherein the non-woven comprises at least two types of electret fibers which are made of different materials.

The non-woven according to the invention preferably comprises two or three types, in particular two types, of electret fibers which are made of different materials.

The contents of the individual types of electret fibers in the electret fiber mixture can be in the range from 10 to 90% by weight, preferably from 25 to 75% by weight, in particular from $33_{1/3}$ to $66_{2/3}\%$ by weight—in each case based on the total content of electret fibers in the non-woven according to the invention.

For example, if a non-woven according to the invention comprises a total of 80% of electret fibers and 20% of binding fibers, the content of the individual types of electret fibers in the total fiber composition of the non-woven can be in the range from 0.8×10 to 0.8×90% by weight (=10 to 90% by weight of 80% by weight).

Those mixtures in which the contents of the individual types of electret fibers in the total content of the electret fibers in the non-woven according to the invention are approximately equal, with a deviation of +10 to −10 percentage points, although the sum of the electret fiber contents must of course be 100% by weight, are particularly preferred.

For example, a preferred non-woven according to the invention which is made exclusively of electret fibers and comprises three types of electret fibers can contain 33.33±10% by weight (i.e. 23.33 to 43.33% by weight) of each of the three types of electret fibers, although, as already stated above, the sum of the electret fiber contents must be 100% by weight.

If a non-woven according to the invention also comprises non-electret fibers, in addition to the electret fiber mixture, the % contents stated of course relate to the total content of electret fibers in the non-woven according to the invention.

If such a non-woven comprises, for example, 20% by weight of binding fibers and a total of 80% by weight of electret fibers of types A, B and C, it could have, for example, the following composition:

| | |
|---|---|
| Content of electret fiber A: | 18.66% by weight (= 0.8 × (33.33 − 10)) |
| Content of electret fiber B: | 26.66% by weight (= 0.8 × (33.33)) |
| Content of electret fiber C: | 34.66% by weight (= 0.8 × (33.33 + 10)) |
| Total electret fiber content: | 79.98% by weight |
| + Binding fiber content: | 20.00% by weight |
| Total | 99.98% by weight |

The different materials can differ in that they comprise different fiber-forming addition or condensation polymer. It is preferable here that the different thread-forming polymers or polycondensates differ in respect of their dielectric constant, as a rule a greater improvement in charge stability and in particular charge development being achieved, the greater the difference between the dielectric constants of the polymers or polycondensates of the electret fibers combined with one another in the non-woven.

The various materials comprise different addition or condensation polymer which are chosen from the group consisting of polyolefins, halogenated polyolefins, polyacrylates, polyacrylonitrile, polystyrene and fluorine polymers, or from the group consisting of polyesters, polycarbonates, aliphatic or aromatic polyamides, polyimides, polyether ketones (for example PEK and PEEK), polyarylene sulfides, in particular polyphenylene sulfide, polyacetals and cellulose esters. Further details on the addition and condensation polymer contained in the fiber materials are given below in the description of the fiber materials and materials employed for preparation of the non-wovens according to the invention.

The different materials can also differ in that they comprise different fiber-forming addition or condensation polymer and different organic or organometallic charge control agents.

The organic or organometallic charge control agents contained in the different materials are chosen from the group consisting of triphenylmethanes; ammonium and immonium compounds; fluorinated ammonium and immonium compounds; bis-cationic acid amides; polymeric ammonium compounds; diallylammonium compounds; arylsulfide derivatives; phenol derivatives; phosphonium compounds and fluorinated phosphonium compounds; calix(n)arenes; metal complex compounds; benzimidazolones; and azines, thiazines or oxazines which are listed in the Color Index as Pigments, Solvent Dyes, Basic Dyes or Acid Dyes.

Further details on the charge control agents contained in the fiber materials are given below under the description of the fiber materials and materials employed for the preparation of the non-wovens according to the invention.

The content of the two or more types of electret fibers in the non-woven according to the invention which imparts to this the desired combination of properties, in particular the further improvement in the electrostatic properties and therefore—when the non-woven is employed as a dust filter—the improved filter efficiency, can be surprisingly small under certain circumstances.

There is often already a noticeable economic and industrial advantage with a non-woven according to the invention which comprises only 10% of electret fiber mixture. As a rule, it is expedient to employ a non-woven according to the invention which comprises 50–100% of electret fibers, it being possible for the highest profiles of industrial requirements to be met, of course, with non-wovens according to the invention which comprise an electret fiber mixture to the extent of 75–100%.

Fibers in the context of the present invention are synthetic continuous fibers (filaments) or staple fibers, expediently with staple lengths of 0.2 to 200 mm, preferably with staple lengths of 0.5 to 50 mm, and also pulps, split fibers or split film fibers, which can also be present in special embodiments for special intended uses.

The linear densities of the synthetic fibers of the non-wovens according to the invention and of the products which may be produced therefrom, in particular the dust filters, are in the range customary for these uses. The two types, at least, of electret fibers contained in non-wovens according to the invention expediently have linear densities in the range from 0.02 to 20 dtex. In the case of the "split film fibers", an average linear density of 0.02 to 30 dtex is appropriate, with small contents of coarser and finer fibers.

Fibers having a linear density of 0.02 to 1 dtex, in particular 0.02 to 0.5 dtex, are preferably prepared by the "splitting" technique (not to be confused with the split film technique). In this technique, bicomponent fibers which are prepared with "island in the sea" cross-sections from electret material and a material soluble in a solvent, the electret material forming the islands, are treated with the solvent in question. The soluble contents of the bicomponent fibers dissolve and the exceptionally fine island fibers are obtained.

Non-wovens according to the invention of fibers having a particularly large surface area, i.e. a fine linear density, for example below 3 dtex, in particular below 2 dtex, or multilobal profile fibers, for example multi-edged or star-shaped profiles or, for example, ribbon or dumbbell profiles.

It may be expedient from case to case to employ mixed linear densities, and in particular electret fibers and normal fibers can have different linear densities in those non-wovens which do not comprise electret fibers to the extent of 100%.

The two types, at least, of electret fibers contained in non-wovens according to the invention furthermore have a tear strength of the fibers of 20 to 80, preferably 30 to 65 cN/tex, an elongation at break of 10 to 200%, preferably 10 to 60%, in particular 20 to 50%, and a heat shrinkage, measured at 200° C. in the dry state ($S_{200}$), of 0 to 50%, preferably <10%.

The textile data of tear strength, elongation and heat shrinkage are controlled as required in the customary manner during preparation by adjusting the spinning speed, the drawing and the setting conditions.

Tear strengths of 20–30 cN/tex are of interest for special uses where it is important for the fibers to be able to tear under certain loads. The usual textile field of use requires strengths of about 30–60 cN/tex. On the other hand, industrial fiber materials must have strengths in the region of up to about 80 cN/tex.

The elongation is also adjusted specifically for the use. Low elongations of about 10–15% are required for industrial high-strength yarns, normal textile uses require fiber materials with an elongation of about 20–40%, and for special uses, for example for the preparation of three-dimensionally shapable textile sheet-like structures, yarns having the highest possible extensibility, for example up to 200%, are desirable. The shrinkage of the fiber materials is adjusted to values below 10% for the usual textile uses, or to <5%, for example, for the preparation of staple fiber non-wovens. However, distinctly high-shrinkage fibers may also be of interest for special uses, for example for compacting or crimping textile sheet-like structures.

The two types, at least, of electret fibers contained in non-wovens according to the invention may have a finish add-on of 0 to 0.3% by weight, preferably 0 to 0.15% by weight. In a preferred embodiment of finished electret fibers according to the invention, these have a hydrophobic finish, in particular such a finish which comprises, as the hydrophobizing agent, wax, a fluorine surfactant and/or a fluorine polymer, such as, for example, polytetrafluoroethylene.

The two types, at least, of electret fibers contained in non-wovens according to the invention can of course also be present in combination with a non-electret material as two-component fibers.

They can be present in the non-wovens according to the invention here, for example, as bicomponent fibers with a core/sheath structure with a core of electret material of the composition stated in claim 1 and a sheath of low-melting polymer material.

Such fibers can be employed with particular advantage for the preparation of heat-bondable continuous or staple fiber non-wovens according to the invention.

The two types, at least, of electret fibers contained in non-wovens according to the invention can also be present as bicomponent fibers with a core/sheath structure with a core of normal fiber material, i.e. any desired spinnable polymer material, and a sheath of electret material of the abovementioned composition.

The electret fibers can also be processed together with other fiber materials, for example with effect yarns or fusible fibers, to give non-wovens according to the invention.

Electret fibers of low or partial orientation, i.e. those which have been drawn only little or not at all, can be employed like normal fibers as melt-bondable fibers for bonding the non-wovens; high-shrinkage electret fibers can be employed for compacting and consolidating the non-wovens.

Multicomponent electret fibers can be in a core/sheath arrangement or also in a side-by-side arrangement, one or both components comprising electret fiber materials. Multicomponent fibers and their preparation are described, for example, in "Falkai, Synthesefasern" (Synthetic fibers), page 124 et seq., in particular FIG. 5.4.

Multicomponent fibers with one electret component can be employed for particular purposes, for example side-by-side fibers as self-crimping fibers if the components have a different heat shrinkage; core/sheath fibers as bonding fibers if the jacket has a relatively low melting point, or with an appropriate cross-sectional arrangement of the components, for example in the island/sea arrangement, also as split fibers for the preparation of particularly fine linear densities of the electret fibers.

Non-wovens according to the invention of continuous fibers are preferably in the form of spun-bonds; non-wovens according to the invention of staple fibers having staple lengths of less than 20 mm are expediently obtained by wet laying processes, and non-wovens of staple fibers having staple lengths of more than 20 mm are expediently in the form of roller carded non-wovens. Non-wovens which comprise both continuous and staple fibers are also of industrial interest.

In many cases, for example, the desired combination of properties of a filament non-woven (such a material comprises continuous filaments) can thus be established by mixing in a suitable content of electret staple fibers.

As already mentioned above, it may furthermore be expedient to prepare non-wovens of mixtures of two or more types of electret fibers according to the invention, each type comprising another of the abovementioned polymers and additionally another of the abovementioned charge control agents.

Mixtures of electret staple fibers and normal staple fibers can of course be laid down in random orientation to give a staple fiber non-woven.

This laying down can be carried out, as is customary, by dry or wet laying down. Staple fibers are laid in the dry state as a rule on the carding machine, while continuous fibers are laid down by the spun-bonding process immediately after spinning. The spun filaments here may also pass through a drawshaft in which they are drawn and accelerated to a speed advantageous for laying down on the moving screen.

The spun-bonded materials as a rule consolidated by passing the freshly laid down filament composition through a calender.

Non-wovens according to the invention which have been consolidated are preferred.

Consolidation of the non-wovens according to the invention can in principle be carried out in any known manner. It is thus possible, for example, for the non-woven to be consolidated by a binder with which the non-woven is impregnated and which is subsequently cured, or the binder can be a fusible binder which, for example, is incorporated in powder form or in the form of binder threads into the web and which consolidates the web under the action of heat to give the actual non-woven.

The web can also be consolidated to the non-woven fabric by calendering, in part mechanical felting of the filaments and in part autogenous welding at the crossing points occurring.

The hot-melt adhesive material can of course also be incorporated into the non-woven as a component of a side-by-side bicomponent fiber or as a sheath of a core/sheath bicomponent fiber.

Non-woven fabrics according to the invention which have been consolidated mechanically have also proved to be advantageous. Mechanical consolidation is to be understood as meaning, for example, needling or also, for example, hydromechanical consolidation, such as is described, for example, in EP-A-0 108 621.

A combination of the various types of consolidation can also be carried out if required.

The weight per unit area of the non-woven fabrics according to the invention depends of course on the intended use. As a rule, it is 5 to 300 g/m², preferably 100 to 250 g/m², but can also be above this for particular tasks, for example up to 1000 g/m².

Other preferred embodiments of the non-woven fabric according to the invention are a spun-bonded material, in particular a spun-bonded material consolidated by needling or hot melt adhesives, or a staple fiber non-woven fabric laid down in the dry or wet state and consolidated by hot-melt adhesives.

If appropriate, the non-woven fabric can also be combined with another textile material, for example another non-woven fabric or a textile material of defined yarn orientation, which can likewise be made of electret fibers or comprise these.

In particular, combination with supporting and reinforcing or also protectively covering textile materials is occasionally desirable. In a preferred embodiment, the electret fiber-containing non-wovens according to the invention are covered on one or, in particular, both sides with a protective textile material, for example a non-woven fabric, in particular a fine non-woven. When the non-wovens according to the invention are employed as dust filters, in particular, combination with coarse or deep bed filters is often expedient.

The present invention also relates to a process for the preparation of the non-woven fabrics according to the invention by random laying down of synthetic continuous or staple fibers in a manner known per se (cf.: "Radko Krcema, Handbuch der Textilverbundstoffe" (Handbook of textile composites), Deutscher Fachverlag GmbH (1970), page 53) on a moving substrate or by forming a non-woven from staple fibers on the roller or flat card and subsequent bonding, wherein at least some of the synthetic fibers laid down are electret fibers.

For the preparation of staple fiber non-woven fabrics which, according to the invention, comprise a content of at least two types of electret fibers, a mixture of at least two types of electret fibers and normal staple fibers can be laid down in the desired mixing ratio in the dry state or by a wet laying process in a manner known per se to give the non-woven and can then be bonded.

However, it is also possible to produce non-woven fabrics from continuous fibers and staple fibers by admixing the staple fibers while laying down the continuous fibers. In this case, the continuous fibers or the staple fibers can optionally completely or partly comprise at least two types of electret fibers.

For preparation of the non-woven fabrics by the spun-bonding process also it is possible to mix normal fibers and at least two types of electret fibers during laying down. For this, for example, the electret fibers can be prepared separately and can be drawn off from fiber reservoirs, for example bobbin frames, and can be fed by jet-blowing into the fiber stream of normal fibers directed towards the laying down operation, or the spinning manifolds used for producing the non-woven filaments can also have spinning openings for electret fibers in addition to spinning openings for normal fibers, the ratio of the various spinning openings and the amount of filaments spun therefrom corresponding to the required ratio of normal and electret fibers in the non-woven fabric.

As a rule, for preparation of non-woven fabrics according to the invention, a total of at least 10% by weight of electret fibers are laid down and a fiber mixture which comprises at least 10% by weight of electret fibers is processed to the non-woven on the roller or flat card.

The total content of electret fibers laid down is preferably 50 to 100%, and to achieve the maximum effect, 75 to 100% of the fibers laid down are electret fibers.

The web is consolidated to give the non-woven fabric in a manner known per se employing a binder or a fusible binder or by calendering or, preferably, by a mechanical route. However, it is also possible to combine various of these consolidation processes with one another.

Binders can be, for example, polymer solutions or dispersions or latices which are applied to the non-woven by impregnation or spraying and which form "binding sails" at the crossing points of the filaments after evaporation of the liquid phase.

However, it is also possible to employ thermosetting binders which cure, if appropriate during heat treatment, and fix the fiber crossing points. Fusible binders, which, for example, are incorporated in the form of powders or, preferably, in the form of binder fibers into the non-woven and which merge at the fiber crossing points when the non-woven is heated above their melting point and form binding points which bond the non-woven to form the non-woven fabric when this is cooled again, can be very successfully employed.

Similar consolidation can be achieved by "autogenous" welding of the non-woven filaments at their crossing points if the non-woven is subjected to calendering close to the melting point of the non-woven filaments.

Mechanical consolidation, for example by needling or by hydromechanical consolidation, such as is described, for example, in EP-A-0 108 621, also gives good results. In this case, the filament material is not exposed to any chemicals or heat at all, so that the advantageous physical properties imparted to the filaments on the basis of their preparation, for example by high speed spinning and drawing operations, are transferred uncurtailed to the non-woven fabric.

To prepare a combination of a non-woven fabric according to the invention with a textile material of defined yarn orientation, the non-woven fabric is to be joined with this textile material such that no delamination can occur. This requirement can best be met if the components are joined by needling, gluing or sewing.

Such composite materials are particularly preferably prepared by the weft inlay Raschel technique.

This is a warp knitting technique in which the non-woven fabric is reinforced in an orientated direction by yarns, preferably high-strength yarns with or without an electret fiber content or of electret fibers. This warp hitting technique is carried out on so-called Raschel machines. A particularly suitable Raschel machine for the preparation of a composite material constructed according to the invention is that of the type RS 3 MSU-V from Karl Mayer, Textilmaschinenfabrik GmbH, Obertshausen.

For preparation reasons, it may be advantageous to provide the fibers with an antistatic finish before formation of the non-woven, this being washed out only at the end of the production process, for example after making up of the filters.

It has been found here, surprisingly, that in many cases an unusually highly dilute finish or even only water can be employed as the antistatic during preparation of the non-wovens. This embodiment of the preparation process is particularly environment-friendly.

The filters are then charged electrostatically in a controlled manner, for example in a corona discharge. Furthermore, it has been found, surprisingly, that during preparation of the non-wovens according to the invention of the two types, at least, of electret fibers on the carding machine or during their use as dust filters, in particular as fine dust filters, or as dust cloths, adequate electrical charging of the non-wovens already occurs in most cases by triboelectric effects because of the gases flowing through or frictional operations, so that a separate charging step can be omitted.

This invention relates to both the electrically neutral non-woven fabrics and those which are electrostatically charged. It is irrelevant here whether the charge has been applied in a controlled manner (for example by corona discharge) or has formed spontaneously due to triboelectric effects.

Compared with non-woven fabrics of only one type of electret fibers, the non-woven fabrics according to the invention of mixtures of electret fibers have electrical properties which are improved further. These evidently essentially result from the interaction of the two types, at least, of electret fibers, i.e. from the differences in the composition of the two materials, at least, from which the two types, at least, of electret fibers of the non-woven fabrics according to the invention are made, in particular from the distance between the polymers or polycondensates in the triboelectromotive series—which correlates with the differences between their dielectric constants—and, where appropriate, the different stabilizing action of the charge stabilizers contained in the materials.

It has furthermore been found, surprisingly, that by the use of electret fiber mixtures in the non-wovens according to the invention it is possible to replace electret materials of polymer materials which undergo a very considerable improvement in their electret properties due to the addition of charge stabilizers, without a loss of action, by electret materials of polymer materials which in themselves display only a slight improvement in their electret properties on addition of charge stabilizers. This is of particular interest in those cases where the polymer materials which show a great improvement in their electret properties are more complicated to prepare and are therefore more expensive than the polymer materials which show only a slight improvement.

The comparison of the degrees of separation (filter efficiency) of the non-woven fabric sample 2 (according to the invention), non-woven fabric sample 4 and non-woven fabric sample 6 prepared in the context of the embodiment examples illustrates this advantage.

The non-wovens according to the invention which comprise at least two types of electret fibers or comprise an active content of these—as already mentioned above -are used particularly advantageously for the production of dust filters (fine dust filters) and dust cloths. The present invention therefore also relates to these uses of the non-woven fabrics according to the invention and to the dust filters and dust cloths comprising or made from a non-woven fabric according to the invention.

While the further improved electrical properties of the non-woven fabrics according to the invention are due essentially to the interaction of the two types, at least, of electret fibers and the characteristic electret behavior of the materials employed for their preparation, the use advantages arise entirely from the advantageous combination of electrical and mechanical and shape—and deformation-based properties of the electret fibers made of these materials.

The materials from which the fibers contained in the non-woven fabrics according to the invention are made are distinguished by an improved charge stability.

This manifests itself in significantly improved application properties for all uses where the presence of an electrostatic charge on the fibers plays a positive role, for example in the use of the non-woven fabrics according to the invention for the production of dust filters and dust cloths. From our knowledge to date, the improvement in charge stability arises on the one hand via an improvement in charge holding, i.e. maintenance of a charge state, once produced on the fibers, under conditions of use, and on the one hand via the effect of spontaneous charge formation due to triboelectric effects, which lead to a dynamic equilibrium of charge. In practice, both effects probably interact, if appropriate to different degrees, depending on which polymer material predominates in the fiber material.

The effect of improved charge holding manifests itself in that the material from which the electret fibers according to the invention are made a) has, after electrical charging, a maximum discharge current at a temperature above 50° C., preferably between 100° and 250° C., in particular between 100° and 180° C., the discharge current curve showing a pronounced descending branch again after passing through the maximum, and b) has a half-life of the electric charge at 25° C. of at least 6 months, where c) its charge-halving temperature is above 100° C., preferably between 100° and 250° C., in particular between 100° and 180° C. and d) has, after standard charging (film earthed on one side and 50 µm thick exposed to a corona discharge for 3 minutes), a charge density of at least $1\times10^{-9}$ coulomb/cm$^2$.

The discharge current of the material is measured by vapor-depositing a layer of aluminum on one side of a circular sample, clamped in a holder, of a film prepared from the material, placing the metallized side on an earthed metal block and charging the sample with a corona discharge from the free side for 3 minutes. The sample is then cooled and conditioned at normal temperature for a few hours. The discharge of the electret sample is then measured with the aid of the "Air Gap Current TSC" method (described in "Electrets", Editor G. M. Sessler, in "Topics in Applied Physics", 2nd edition (1987), volume 33, page 95 et seq., Springer Verlag) at a heating-up rate of 2° C./minute.

During heating up, the discharge current is measured continuously and plotted against the temperature. In addition to the amount of charge, the position of the temperature peaks of the discharge current and the presence of a descending branch of the discharge curve after the peaks is characteristic of the material.

The half-life of the electret charge is the period of time within which the charge originally applied to the electret material has fallen to half at 25° C.

The charge-halving temperature is to be understood as meaning that temperature at which, at a heating-up rate of 2° C./minute, the charge density of the material has fallen to half its value at 25° C.

Many electret fibers employed according to the invention surprisingly show a high triboelectric effect, i.e. they have a great tendency to become charged spontaneously by interaction with one another and with their environment. This means that the dust filters made of these fibers or comprising these fibers also spontaneously achieve a considerably higher electrostatic charge and therefore a considerably better separation of particles than a dust filter of the same construction of normal fibers while gases flow through (for example during use) or by friction of the fibers against one another or against other solid materials, without separate electrical charging (for example by a corona discharge).

It is particularly surprising that the significant improvement in the degree of separation of dust particles also results when, for example, no electrostatic field at all can be measured within a distance of a few centimeters from the filter material.

The relative improvement $TR_\%$ in [%] of the degree of separation $T(x)$, which can easily be measured under standard conditions, of a non-woven fabric filter according to the invention of electret fibers compared with an identical filter of normal fibers is therefore a parameter which is particularly suitable for characterizing the improvement in charge stability of the electret fibers contained in the non-woven fabrics according to the invention.

To determine the fiber parameter $TR_\%$, a non-woven fabric is prepared from the electret fibers according to the invention, which are to be investigated, with a weight per unit area of $100\pm5$ g/m$^2$, a fiber linear density of $1.7\pm0.2$ dtex and a density corresponding to a pressure difference before and after the filter of 8–12 Pa at a flow rate of 20 cm/s, the non-woven fabric comprising 80% by weight of the electret fibers to be tested and 20% by weight of bicomponent binding fibers.

A second non-woven fabric filter which is the same in respect of weight per unit area, filament denier and density but which, instead of the electret fibers to be investigated, comprises normal fibers (i.e. fibers of the same polymer material but without a content of charge control agent) is also produced.

The degree of separation for dust particles having an average particle size of 0.3 to 0.5 µm is measured for both filters.

If $T(x)$ is the degree of separation of the filter according to the invention and $T'(x)$ is that of the comparison filter, $T_E = \ln(1-T(x))$ and $T_V = \ln(1-T'(x))$ for x values of 0.3 to 0.5 µm, and $TR_\%$ is given by the formula $$TR_\% [\%] = \frac{T_E \times 100}{T_v} - 100$$

The two types, at least, of electret fibers contained in the non-woven fabrics according to the invention have a $TR_\%$ value of at least 30%, preferably at least 50%, for example 40 to 60%, and/or they have the features which characterize the charge holding mentioned above under a) to d).

For such electret fibers employed according to the invention which are prepared on the basis of a polymer of low charge holding, the $TR_\%$ value essentially characterizes the contribution of the triboelectric effect to the improvement in charge stability of the electret fibers compared with normal fibers.

The improvement in charge stability of course correlates within certain limits with the concentration of the charge control agent in the material of the electret fibers according to the invention.

The concentration is adjusted such that the fibers show an adequate improvement in electrostatic properties, while simultaneously retaining good textile and mechanical properties, compared with conventional fibers.

The materials as a rule chiefly comprise an addition or condensation polymer, but can also comprise other polymers or monomers or also inorganic additives which are usually present in synthetic fiber materials in order to develop specific properties. Matting agents may merely be mentioned as an example.

Polymers in the context of this invention are to be regarded as not only the high molecular weight compounds obtained by addition polymerization, such as, for example, polyolefins, polyacrylates, polyacrylonitrile and the like, but also those which can be prepared by polycondensation, such as, for example, polyesters or polyamides and the like.

The addition and condensation polymers chiefly contained in the electret materials to be employed according to the invention as a rule have intrinsic viscosities of 0.45 to 1.2, preferably 0.6 to 0.9 dl/g, measured in dichloroacetic acid at 25° C. and can be spun by melt spinning or in solution.

Polymers which can be spun from solutions by wet or dry spinning processes allow the use of less heat-stable charge control agents.

The materials preferably chiefly comprise a fiber-forming polymer from the group consisting of polyethylene, polypropylene, polyacrylonitrile, polytetrafluoroethylene and perfluorinated ethylene/propylene copolymer, in particular from the group consisting of polyethylene and polypropylene.

Preferred materials which chiefly comprise a fiber-forming polycondensate are based on polycondensates from the group consisting of polyesters, in particular poly-alkylene terephthalate, such as, for example, polyethylene terephthalate, or on cellulose esters, in particular cellulose acetate and triacetate.

Non-woven fabrics according to the invention which comprise or are made of electret fibers of aromatic polyamides, polyether ketones (for example PEK and PEEK) and polyarylene sulfides, in particular polyphenylene sulfides, in particular meet requirements of increased chemical and/or heat stability.

In another preferred embodiment of the invention, the material chiefly comprises a fiber-forming polycondensate from the group consisting of polyesters, polyether ketones and polyphenylene sulfide, in particular poly-alkylene terephthalate.

In another preferred embodiment of the invention, the material chiefly comprises polypropylene. Polypropylene electret threads and polyester electret threads according to the invention can be particularly advantageously employed in motor vehicle construction from the aspect of type purity (easily recyclable).

The two different materials, at least, of the two types, at least, of electret fibers of the non-woven fabrics according to the invention comprise charge control agents which are the same as or different from those contained in toners for electrophotographic processes.

A large number of charge control agents for electrophotographic processes is known from the patent literature.

The materials accordingly comprise, as charge control agents, one or various compounds from the following classes:

triphenylmethanes; ammonium and immonium compounds; fluorinated ammonium immonium compounds; bis-cationic acid amides; polymeric ammonium compounds; diallyl-ammonium compounds; aryl sulfide derivatives; phenol derivatives; phosphonium compounds and fluorinated phosphonium compounds; calix(n)arenes; metal complex compounds; benzimidazolones; or azines, thiazines or oxazines which are listed in the Color Index as Pigments, Solvent Dyes, Basic Dyes or Acid Dyes.

Preferably, the charge control agents are contained in the fiber material chiefly in dispersed form. This means that the material is preferably a multi-phase system in which the charge control agent forms a finely divided solid phase which is finely dispersed in the continuous phase of the fiber-forming polymer or polycondensate. "Chiefly" in the context of this invention means that a certain, usually low content of the charge control agent can also be genuinely dissolved in the thread-forming polymer or polycondensate, i.e. is present in molecular distribution. The level of this content depends of course on the solubility of the charge control agent in the polymer or polycondensate.

The lower limit of the average particle size of the dispersed charge control agents can be at the lower limit of colloidal distribution, i.e. on average at least one dimension of the particles has a size of about 1 nm. The upper limit is as a rule at about 20 µm.

In special cases, for example for the preparation of the dispersions by precipitation operations or by special crystallization or grinding processes, the charge control agents can also have average particle sizes of less than 1 nm or more than 20 µm.

In an individual case, the particle size of the charge control agents to be dispersed in is expediently established such that the optimum charge stabilization results. The (re-)dispersibility (i.e. the division of any agglomerates formed from primary particles and/or aggregates) and the homogenizability of the dispersions is of course also to be taken into account appropriately.

In practice, particle sizes of 0.01 to 10 µm, in particular 0.03 to 1.0 µm, have proved suitable for the charge control agents dispersed into the electret fibers according to the invention.

The stability of the dispersion of the charge control agents contained in the electret fibers according to the invention over relatively long periods of time and/or under stress conditions is also of particular importance for the application properties of these fibers.

The narrowest possible particle size distribution of the charge control agents in the electret fibers according to the invention is also particularly advantageous.

Charge control agents which are contained individually or in combination with one another in the electret fibers of the non-woven fabrics according to the invention and impart to these very good electrostatic properties are:

1.

Triarylmethane derivatives, such as, for example: Color Index Pigment Blue 1, 1:2, 2, 3, 8, 9, 9:1, 10, 10:1, 11, 12, 14, 18, 19, 24, 53, 56, 57, 58, 59, 61, 62, 67 or, for example, Color Index Solvent Blue 2, 3, 4, 5, 6, 23, 43, 54, 66, 71, 72, 81, 124, 125, and the triarylmethane compounds listed in the Color Index under Acid Blue and Basic Dye if they are suitable in respect of their heat stability and processibility, such as, for example, Color Index Basic Blue 1, 2, 5, 7, 8, 11, 15, 18, 20, 23, 26, 36, 55, 56, 77, 81, 83, 88, 89, and Color Index Basic Green 1, 3, 4, 9, 10, Color Index Solvent Blue 125, 66 and 124 in turn being especially suitable. Color Index Solvent Blue 124 in the form of its highly crystalline sulfate or trichloro-triphenylmethyl-tetra-chloroaluminate is particularly suitable.

Other examples of charge control agents of the triphenylmethane series which are particularly suitable for the preparation of electret fibers according to the invention are the compounds described in DE-PS 1 919 724 and DE-PS 1 644 619.

Furthermore triphenylmethanes as described in U.S. Pat. No. 5,051,585, in particular those of the formula I

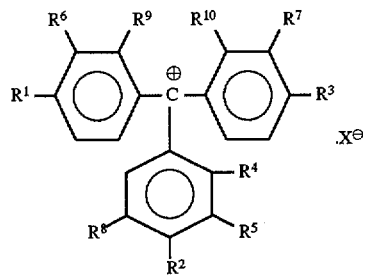

in which $R^1$ and $R^3$ are identical or different and are—$NH_2$, a mono-or dialkylamino group, the alkyl groups of which have 1–4, preferably 1 or 2, carbon atoms, a mono- or di-omega-hydroxyalkylamino group, the alkyl groups of which have 2–4, preferably 2, carbon atoms, or an optionally N-alkyl-substituted phenyl- or phenalkylamino group, the alkyl of which has 1–4, preferably 1 or 2, carbon atoms, the phenalkyl group of which has 1 to 4, preferably 1 or 2, carbon atoms in the aliphatic bridge and the phenyl nucleus of which has one or two of the following substituents: alkyl having 1 or 2 carbon atoms and alkoxy having 1 or 2 carbon atoms, and can carry the sulfonic acid group, $R^2$ is hydrogen or has one of the meanings given for $R^1$ and $R^3$, $R^4$ is hydrogen, halogen, preferably chlorine, or a sulfonic acid group, or together with $R^5$ forms a fused-on phenyl ring, $R^5$ together with $R^4$ forms a fused-on phenyl ring, $R^6$, $R^7$, $R^9$ and $R^{10}$ are each hydrogen or an alkyl radical having 1 or 2 carbon atoms, preferably methyl, and $R^8$ is hydrogen or halogen, preferably chlorine, and $X^-$ is one equivalent of an anion, in particular a chloride, sulfate, molybdate, phosphomolybdate or borate anion.

A charge control agent of the formula 1 in which $R^1$ and $R^3$ are phenylamino groups, $R^2$ is an m-methyl-phenylamino group and the radicals $R^4$ to $R^{10}$ are all hydrogen is particularly preferred.

2.

Ammonium and immonium compounds as described in U.S. Pat. No. 5,015,676.

3.

Fluorinated ammonium and immonium compounds as described in U.S. Pat. No. 5,069,994, in particular those of the formula 3

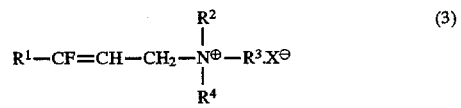

in which $R^1$ is perfluorinated alkyl having 5–11 carbon atoms, $R^2$, $R^3$ and $R^4$ are identical or different and are alkyl having 1–5, preferably 1–2, carbon atoms and $X^-$ is one equivalent of an anion, preferably a tetrafluoroborate or tetraphenylborate anion.

Preferably, $R^1$ is perfluorinated alkyl having 5–11 carbon atoms, $R^2$ and $R^3$ are ethyl and $R^4$ is methyl.

4.

Bis-cationic acid amides as described in PCT-A-91/10172, in particular those of the formula 4

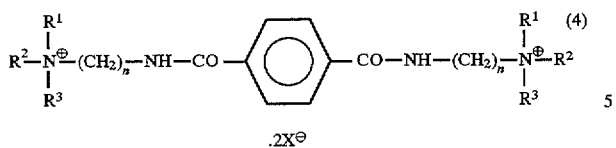

in which
R$^1$, R$^2$ and R$^3$ are identical or different alkyl radicals having 1–5 carbon atoms, preferably methyl,
n is an integer from 2 to 5,
and X$^-$ is one equivalent of an anion, preferably a tetraphenylborate anion.

5.
Diallylammonium compounds as described in DE-A-4 142 541, in particular those of the formula 5

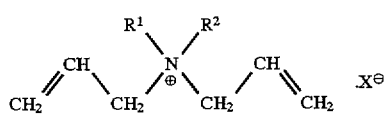

in which
R$^1$ and R$^2$ are identical or different alkyl groups having 1–5, preferably 1 or 2, carbon atoms, but in particular methyl groups, and X$^-$ is one equivalent of an anion, preferably a tetraphenylborate anion, and the polymeric ammonium compounds of the formula 6 obtainable from these (as described in DE-A-4 029 652 or DE-A-4 103 610)

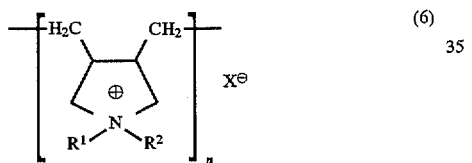

in which
n has a value which corresponds to molecular weights of 5000 to 500,000. However, compounds of the formula 6 having molecular weights of 40,000 to 400,000 are particularly preferred.

6.
Aryl sulfide derivatives as described in DE-A-4 031 705, in particular those of the formula 7

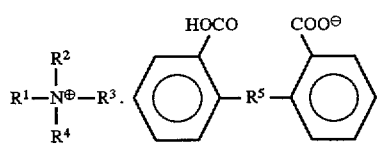

in which
R$^1$, R$^2$, R$^3$ and R$^4$ are identical or different alkyl groups having 1–5, preferably 2 or 3, carbon atoms and
R$^5$ is one of the divalent radicals —S—, —S—S—, —SO— or —SO$_2$—.

For example, R$^1$ to R$^4$ are propyl groups and R$^5$ is the group —S—S—.

7.
Phenol derivatives as described in EP-A-0 258 651, in particular those of the formula 8

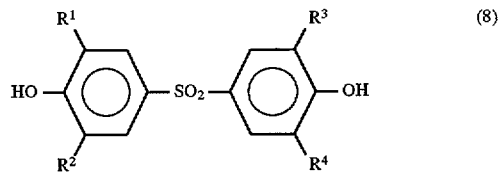

in which
R$^1$ and R$^3$ are alkyl or alkenyl groups having 1 to 5, preferably 1 to 3, carbon atoms and
R$^2$ and R$^4$ are hydrogen or alkyl having 1 to 3 carbon atoms, preferably methyl.

The compounds in which R$^1$ to R$^4$ are methyl groups or in which R$^2$ and R$^4$ are hydrogen and R$^1$ and R$^3$ are the group —CH$_2$—CH=CH$_2$ may be mentioned as an example.

8.
Phosphonium compounds and fluorinated phosphonium compounds as described in U.S. Pat. No. 5,021,473 and in U.S. Pat. No. 5,147,748, in particular those of the formulae 9

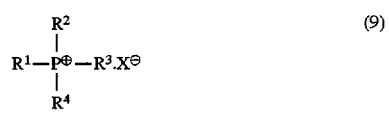

in which
R$^1$, R$^2$, R$^3$ and R$^4$ are identical or different alkyl groups having 1–8, preferably 3 to 6, carbon atoms and X$^-$ is one equivalent of an anion, preferably a halide anion, and 10;

in which
R$^1$ is a highly fluorinated alkyl radial having 5–15, preferably 6–10, carbon atoms,
R$^2$, R$^3$ and R$^4$ are alkyl having 3–10 carbon atoms or phenyl and
X$^-$ is one equivalent of an anion.

Tetrabutyl-phosphonium bromide may be mentioned as an example of a compound of the formula 9 and the compounds where R$^1$=C$_8$F$_{17}$—CH$_2$—CH$_2$—, R$^2$=R$^3$=R$^4$= phenyl and X$^-$=PF$_6$— or the tetraphenylborate anion may be mentioned as examples of compounds of the formula 10.

9.
Calix(n)arenes as described in EP-A-0 385 580 and as described in EP-A-0 516 434, in particular those of the formula 11

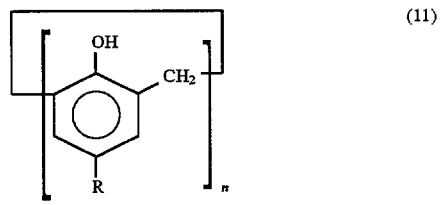

in which
R is hydrogen, halogen, preferably chlorine, straight-chain or branched alkyl having 1–12 carbon atoms, aralkyl, for example benzyl or phenethyl, —NO$_2$, —NH$_2$, —NHR$^1$ or HR$^1$R$^2$, in which R$^1$ is alkyl having 1–8 carbon atoms, optionally substituted phenyl or —Si(CH$_3$)$_3$.

10.

Metal complex compounds, such as chromium, cobalt, iron, zinc or aluminum azo complexes or chromium, cobalt, iron, zinc or aluminum salicylic acid complexes of the formulae 12, 13 and 14

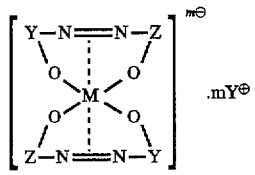
(12)

in which

M is a 2- or 3-valent metal atom, preferably chromium, cobalt, iron, zinc or aluminum, Y and Z are divalent aromatic rings, preferably of the formulae

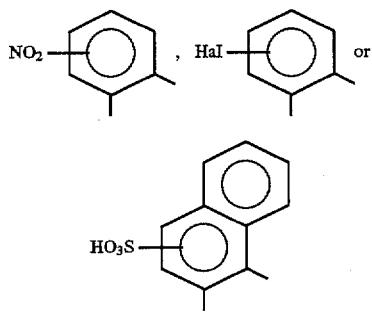

m is one of the numbers 1 or 2 and $K^+$ is one equivalent of a cation,

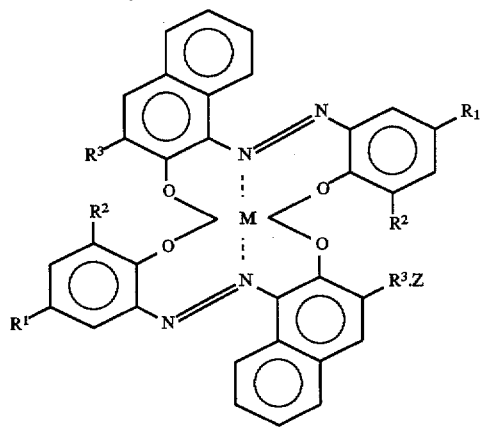

in which

M is a 2- or 3-valent metal atom, preferably chromium, cobalt or iron, $R^1$ is hydrogen, halogen, preferably Cl, nitro or amidosulfonyl, $R^2$ is hydrogen or nitro, $R^3$ is hydrogen, the sulfonic acid group or —CO—NH—$R^4$, in which $R^4$=phenyl or alkyl having 1-5 carbon atoms, which can optionally be substituted by a mono-, di- or tri-alkylamino group, and Z is a counter-ion which establishes the neutrality of the complex, preferably a proton, an alkali metal ion or an ammonium ion.

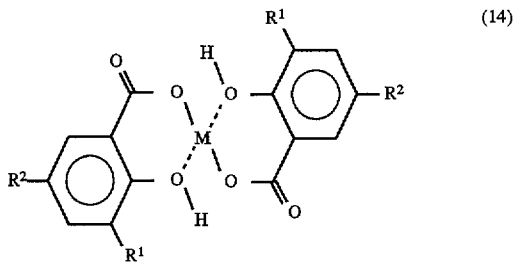
(14)

in which

M is a divalent metal central atom, preferably a zinc atom, and $R^1$ and $R^2$ are identical or different straight-chain or branched alkyl groups having 1–8, preferably 3–6, carbon atoms, for example tert-butyl.

Such compounds are described in EP-A-0 162 632, U.S. Pat. No. 4,908,225, EP-A-0 393 479, EP-A-0 360 617, EP-A-0 291 930, EP-A-0 280 272, EP-A-0 255 925, EP-A-0 251 326, EP-A-0 180 655, EP-A-0 141 377, U.S. Pat. No. 4,939,061, U.S. Pat. No. 4,623,606, U.S. Pat. No. 4,590,141 and/or are characterized by the CAS numbers 31714-55-3, 104815-18-1, 84179-68-8, 110941-75-8, 32517-36-5, 38833-00-00, 95692-86-7, 85414-43-3, 136709-14-3, 135534-82-6, 135534-81-5, 127800-82-2, 114803-10-0, 114803-08-6.

Examples of particularly preferred metal complex compounds of the above formula 13 are given in the following Table.

TABLE

| $R^1$ | $R^2$ | $R^3$ | $R^4$ | M | Z |
|---|---|---|---|---|---|
| Cl | H | H | — | Cr | $H^+$ |
| $NO_2$ | $NO_2$ | —$CONHR^4$ | Phenyl | Cr | $H^+/Na^+/NH_4^+$ |
| Cl | H | —$CONHR^4$ | Phenyl | Fe | $H^+/Na^+/NH_4^+$ |
| Cl | H | —$CONHR^4$ | —$(CH_2)_3$—$N^+(CH_3)_3$ | Cr | $Cl^-$ |
| —$SO_2NH_2$ | H | H | — | Co | $H^+/Na^+/NH_4^+$ |

11.

Benzimidazolones as described in EP-A-0 347 695, in particular those of the formula 15

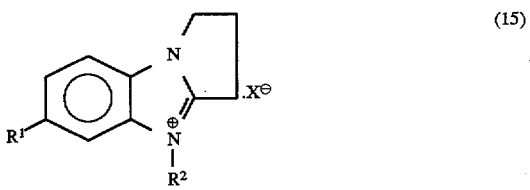
(15)

in which $R^1$ is alkyl having 1–5 carbon atoms and $R^2$ is alkyl having 1–12 carbon atoms, and X is one equivalent of an anion, in particular a chloride or tetrafluoborate anion (the compound where $R^1=CH_3$ and $R^2=C_{11}H_{23}$ may be mentioned as an example).

Or azines of the following Color Index numbers: C.I. Solvent Black 5, 5:1, 5:2, 7, 31 and 50; C.I. Pigment Black 1, C.I. Basic Red 2 and C.I. Basic Black 1 and 2.

The material preferably comprises, as charge control agents, one or more different compounds from the following classes:

triphenylmethanes of the formula 1; diallylammonium compounds of the formula 5 and the polymeric ammonium compounds of the formula 6 obtainable therefrom; arylsulfide derivatives of the formula 7; and metal complex compounds of the formulae 12 and 13.

Electret fibers according to the invention which are particularly preferred are those of which the material comprises, as the charge control agent, a compound of the formula 1 in which $R^1$ and $R^3$ are phenylamino and $R^2$ is 3-methylphenylamino, and $X^-$ is one sulfate equivalent. This compound, known as C.I. Solvent Blue 124, corresponds to the following formula 16:

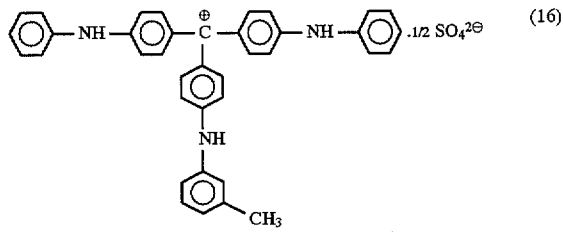

Electret fibers according to the invention which are also particularly preferred are those of which the material comprises, as the charge control agent, a compound of the formula 5 or 6 in which $R^1$ and $R^2$ are methyl and $X^-$ is a tetraphenylborate anion.

Electret fibers according to the invention which are furthermore particularly preferred are those of which the material comprises, as the charge control agent, a compound of the formula 7 in which $R^1$, $R^2$, $R^3$ and $R^4$ are propyl and $R^5$ is a disulfide bridge, or of the formula 13 in which $R^1$ is chlorine, $R^2$ is hydrogen and Z is a proton.

The electret fibers are prepared by spinning a fiber-forming material from the melt or from a solution in a suitable solvent, it being possible to carry out the preparation in a manner known per se by the wet spinning or dry spinning process, if necessary cooling the spun filaments, taking off at a speed in the range from about 100 to 8000 m/min, preferably 1000 to 5000 m/min, and subsequent further customary process steps, such as drawing, if necessary, and, depending on the intended further use, laying down randomly or cutting to staple fibers, a material which chiefly comprises a fiber-forming polymer or polycondensate and 0.01 to 30% by weight (preferably 0.01 to 10, in particular 0.1 to 5% by weight), based on the weight of the material, of organic or organometallic charge control agents being spun.

Alternatively, the electret fibers are prepared by splitting multilobal fibers which can be split and which comprise segments of the electret material extending along the fiber axis, or by dissolving an "island in the sea" filament, the island regions of which comprise the electret material, in a matrix, or by splitting a film of the electret material, the electret material chiefly comprising a fiber-forming polymer or polycondensate and 0.01 to 30% by weight (preferably 0.01 to 10, in particular 0.1 to 5, % by weight), based on the weight of the material, of organic or organometallic charge control agents.

A possible further alternative for the preparation of the electret fibers is the fiber-blowing process as described in German Patent Application 19 64 060 or "flash spinning" in an electrostatic field, as is described in U.S. Pat. No. 3,319,309, in each case using the electret material to be employed according to the invention.

In the case of melt spinning, the electret material is heated to a temperature of about 30°–50° C. above the melting point of the polymer and the melt is extruded through spinneret orifices in the customary manner. The temperature of the melt is chosen within the range stated such that an optimum flow of the material is established, which allows the shearing forces required for orientation of the filaments to be built up under a spinning pressure which is not too high.

For example, a material which chiefly comprises polypropylene is spun at about 260° C., and a material based on polyester is spun at about 280°–310° C.

If the polymer is spun from the melt, the filaments taken off from the spinning openings must be solidified by cooling. Cooling can be carried out in any known manner, and also allows the filament properties to be controlled in a specific manner during processing of the electret material. Thus, for example, it is possible to delay cooling by a reheater if fibers having special shrink-age/strength characteristics are to be prepared, or sharp asymmetric quenching can be carried out if self-crimping fibers are to be prepared. In contrast, so-called central quenching, which ensures a particularly uniform and therefore stress-free cooling of the filaments, is recommended in particular for the preparation of fine individual linear densities of less than 1 dtex.

Spinning of the electret fibers from solutions of the material in a suitable solvent is likewise carried out by well-known processes. The same conditions as for normal polymers can in principle be chosen here. The solution emerging from the spinneret can be solidified by evaporation of the solvent in the case of dry spinning or by precipitation of the material in filament form in a precipitating bath in the case of wet spinning.

Advantages result here in particular in respect of the composition of the material. In particular, it is also possible to employ those materials which comprise a charge control agent which is not stable at the melting point of the polymer material.

In addition to spinnerets with circular spinning openings, those with profiled openings can also be employed in the spinning processes mentioned, and multi-component filaments in side-by-side arrangement or of the core/sheath type can be spun through special arrangements or designs for openings which are known per se.

Spinning take-off speeds of down to 100 m/min are mainly used for the preparation of linear densities above 4 dtex.

Spinning take-off speeds of between 1000 and 5000 m/min are economically more interesting, very fine linear densities being spun in particular at the highest rates of this range.

The material to be spun is prepared by homogeneous incorporation of the charge control agents into the polymer material which the material chiefly comprises. It is particularly advantageous here to employ the charge control agent in the form of a masterbatch.

The spun filaments are as a rule subjected to drawing, the extent of which is determined on the one hand by the spun orientation of the filaments and on the other hand by the desired strength and extensibility properties. While filaments which have been obtained at spinning speeds of less than 1000 m/min require vigorous drawing if they are to be processed to textile yarns or sheet-like structures, the extent of the drawing required decreases continuously as the spinning speed increases, since these filaments already have a relatively high spun orientation.

Extremely fine linear densities which are spun at the highest speeds of this range are therefore fully orientated filaments (so-called FOY) and require no after-stretching.

If high-strength filaments are to be prepared, drawing to an elongation at break of about 10% or less is customary, and for particularly extensible filaments, for example for the production of deep-drawable sheet-like structures, drawing is only slight and is chosen such that elongations at break of up to 200% result. The filaments can be subjected to drawing either in the form of multifilament yarns or in the form of tows.

The tension necessary for drawing can be generated by godets or by drawing nozzles or drawshafts. While godets pull the filaments or yarns along by friction on the rotating godet surface, the filaments are carried along by a powerful stream of air in drawing nozzles or drawshafts.

Drawshafts are of particular importance for random laying down of filament material for the preparation of random non-wovens, in particular "spun-bonded" materials.

Drawing can be carried out at room temperature or at elevated temperature, in particular above the glass transition point. So-called cold drawing as a rule leads to special high-shrinkage filaments, while hot drawing leads to filaments which have the customary shrinkage values of 0 to 10% which are expedient for textiles. Drawing of the filament materials can be carried out in one or more stages in a known manner.

The electret fibers can also be provided with all the known texturings. It is thus possible to subject the filaments, preferably in cable form, to stuffer box crimping.

The side-by-side bicomponent fibers with an electret content already mentioned above can also be crimped by inducing shrinkage if a component having shrinkage characteristics which differ from those of the electret material is chosen.

The following embodiment examples illustrate the implementation of the present invention.

EXAMPLE A1

Preparation of Polyester Electret Fibers

Polyethylene terephthalate fiber raw material was modified according to the invention by mixing with an amount of the charge control agent of the formula 16 (C.I. Solvent Blue 124) in the form of a masterbatch such that the concentration of Solvent Blue 124 in the spun goods was 1.0% by weight. The masterbatch was prepared from the highly crystalline form of the charge control agent, the X-ray diagram of which (Cu—K alpha radiation) shows an intense reflection at 2 $\delta°=18.47$, three medium-strength reflections at 2 $\delta°=6.97$; 12.1 and 13.9 and weak broad reflections at 2 $\delta°=20.0$; 21.7; 22.5; 24.8; 28.2; 30.7 and 32.2.

The material thus prepared was spun by conventional melt spinning technology. The spinning temperature was 280° C. and the spinning take-off speed was 1500 m/min.

The spun goods produced were processed by similarly conventional production line technology (stuffer box crimping, setting and cutting) to wool-like staple fibers, modified according to the invention, having an individual linear density of 1.3 dtex.

EXAMPLE A2

Preparation of Normal Polyester Fibers

The polyester fiber raw material employed in Example A1, but to which no charge control agent had been added, was spun by conventional melt spinning technology exactly as in Example A1. The spinning temperature was 305° C. and the spinning take-off speed was 1500 m/min.

The spun goods produced were processed by similarly conventional production line technology (stuffer box crimping, setting and cutting) to wool-like staple fibers, modified according to the invention, having an individual linear density of 1.3 dtex.

EXAMPLE B1

Preparation of High-Modulus Aramid (HMA) Electret Fibers

High-modulus aramid fiber raw material was modified according to the invention by mixing with an amount of the charge control agent of the formula 6 in which $R^1$ and $R^2$ are methyl groups (commercial product (R)Copy Charge NX VP 434) such that the concentration of the Copy Charge in the spun goods was 1.0% by weight. The material thus prepared was spun by conventional technology, using N-methylpyrrolidone (NMP) as the polymer solvent, but without application of a finish. The spinning shaft temperature was 135° C.

The spun goods produced were processed to staple fibers modified according to the invention and having an individual linear density of 1.8 dtex.

EXAMPLE B2

Preparation of High-Modulus Aramid Normal Fibers

The high-modulus aramid fiber raw material employed in Example B1, but to which no charge control agent had been added, was spun by conventional technology, but without application of a finish, exactly as in Example B1.

The spun goods produced were processed as in Example B1 to staple fibers modified according to the invention and having an individual linear density of 1.8 dtex.

Preparation of Non-Woven Fabric

Non-wovens having a weight per unit area of 200 g/m² were prepared from the staple fibers prepared in Examples A1, A2, B1 and B2 and from mixtures of these fibers and in each case 20% by weight of binding fibers (type: bicomponent fiber of polyester/copolyester in core/sheath structure with a sheath melting point of 110° C., linear density 3.0 dtex, staple length 50 mm; (R) TREVIRA 252) in the compositions shown below on an experimental roller card. The non-wovens were consolidated thermally at 160° C. over a residence time of 3 minutes.
Non-woven fabric sample 1:
  m =200 g/m²;
  40% by weight of PES normal fibers A2,
  40% by weight of HMA normal fibers B2,
  20% by weight of bicomponent binding fibers
Non-woven fabric sample 2 (according to the invention):
  m =200 g/m²;
  40% by weight of PES electret fibers A1,
  40% by weight of HMA electret fibers B1,
  20% by weight of bicomponent binding fibers
Non-woven fabric sample 3:
  m =200 g/m²;
  80% by weight of HMA normal fibers B2,
  20% by weight of bicomponent binding fibers
Non-woven fabric sample 4:
  m =200 g/m²;
  80% by weight of HMA electret fibers B1,
  20% by weight of bicomponent binding fibers
Non-woven fabric sample 5:
  m =200 g/m²;
  80% by weight of PES normal fibers A2, 20% by weight of bicomponent binding fibers Non-woven fabric sample 6:

m =200 g/m$^2$;

80% by weight of PES electret fibers A1,

20% by weight of bicomponent binding fibers

The separation capacity of the non-wovens prepared was tested in a conventional filter test bed which operates in accordance with the principle of scattered light measurement. The following test parameters were established here:

flow rate: 20 cm/second, particle weight concentration: 50 mg/m$^3$, dust loading time: varies from 1 to 10 minutes, test dust: "ac fine" with the following composition:

| Particle size | Particle content [%] |
|---|---|
| 0.3–0.5 μm | 55.5 |
| 0.5–1.0 μm | 17.3 |
| 1.0–3.0 μm | 26.6 |
| 3.0–5.0 μm | 0.5 |
| >5.0 μm | not relevant |

The separation capacities achieved with these non-woven samples are to be found in the following tables:

TABLE 1

Degrees of separation T(x) of non-woven fabric sample 1 as a function of the dust loading times t from 1 to 10 minutes; pressure difference: 30 Pa

| Particle size [μm] | Degree of separation T(x) of the non-woven fabric filter after a dust loading time of 1 to 10 minutes | | | | | | | | | |
|---|---|---|---|---|---|---|---|---|---|---|
| | 1 | 2 | 3 | 4 | 5 | 6 | 7 | 8 | 9 | 10 |
| 0.3 | 0.94 | 0.94 | 0.93 | 0.93 | 0.93 | 0.92 | 0.92 | 0.92 | 0.92 | 0.91 |
| 0.5 | 0.96 | 0.96 | 0.95 | 0.95 | 0.94 | 0.94 | 0.94 | 0.94 | 0.94 | 0.94 |
| 1.0 | 0.97 | 0.97 | 0.97 | 0.97 | 0.97 | 0.96 | 0.96 | 0.95 | 0.95 | 0.95 |
| 3.0 | 0.99 | 0.99 | 0.99 | 0.99 | 0.99 | 0.99 | 0.99 | 0.99 | 0.99 | 0.99 |
| 5.0 | 0.99 | 0.99 | 0.99 | 0.99 | 1.00 | 0.99 | 0.99 | 0.99 | 0.99 | 0.99 |

TABLE 2

Degrees of separation T(x) of non-woven fabric sample 2 as a function of the dust loading times t from 1 to 10 minutes; pressure difference: 31 Pa

| Particle size [μm] | Degree of separation T(x) of the non-woven fabric filter after a dust loading time of 1 to 10 minutes | | | | | | | | | |
|---|---|---|---|---|---|---|---|---|---|---|
| | 1 | 2 | 3 | 4 | 5 | 6 | 7 | 8 | 9 | 10 |
| 0.3 | 0.98 | 0.98 | 0.98 | 0.98 | 0.98 | 0.98 | 0.98 | 0.97 | 0.97 | 0.97 |
| 0.5 | 0.99 | 0.99 | 0.99 | 0.99 | 0.99 | 0.98 | 0.98 | 0.98 | 0.98 | 0.98 |
| 1.0 | 1.00 | 1.00 | 0.99 | 0.99 | 0.99 | 0.99 | 0.99 | 0.99 | 0.99 | 0.99 |
| 3.0 | 1.00 | 1.00 | 1.00 | 1.00 | 1.00 | 1.00 | 1.00 | 1.00 | 1.00 | 1.00 |
| 5.0 | 1.00 | 1.00 | 1.00 | 1.00 | 1.00 | 1.00 | 1.00 | 1.00 | 1.00 | 1.00 |

TABLE 3

Degrees of separation T(x) of non-woven fabric sample 3 as a function of the dust loading times t from 1 to 10 minutes; pressure difference: 30 Pa

| Particle size [μm] | Degree of separation T(x) of the non-woven fabric filter after a dust loading time of 1 to 10 minutes | | | | | | | | | |
|---|---|---|---|---|---|---|---|---|---|---|
| | 1 | 2 | 3 | 4 | 5 | 6 | 7 | 8 | 9 | 10 |
| 0.3 | 0.91 | 0.91 | 0.90 | 0.89 | 0.88 | 0.88 | 0.87 | 0.87 | 0.86 | 0.86 |
| 0.5 | 0.94 | 0.94 | 0.93 | 0.92 | 0.92 | 0.91 | 0.91 | 0.91 | 0.90 | 0.90 |
| 1.0 | 0.95 | 0.95 | 0.95 | 0.94 | 0.94 | 0.94 | 0.93 | 0.93 | 0.93 | 0.93 |
| 3.0 | 0.98 | 0.98 | 0.99 | 0.98 | 0.98 | 0.98 | 0.98 | 0.98 | 0.98 | 0.98 |
| 5.0 | 1.00 | 1.00 | 1.00 | 1.00 | 1.00 | 0.99 | 1.00 | 1.00 | 1.00 | 1.00 |

TABLE 4

Degrees of separation T(x) of non-woven fabric sample 4
as a function of the dust loading times t from 1 to 10 minutes;
pressure difference: 31 Pa

| Particle size [μm] | Degree of separation T(x) of the non-woven fabric filter after a dust loading time of 1 to 10 minutes | | | | | | | | | |
|---|---|---|---|---|---|---|---|---|---|---|
| | 1 | 2 | 3 | 4 | 5 | 6 | 7 | 8 | 9 | 10 |
| 0.3 | 0.98 | 0.98 | 0.98 | 0.98 | 0.98 | 0.98 | 0.98 | 0.98 | 0.97 | 0.97 |
| 0.5 | 0.99 | 0.99 | 0.99 | 0.99 | 0.98 | 0.98 | 0.98 | 0.98 | 0.98 | 0.98 |
| 1.0 | 0.99 | 0.99 | 0.99 | 0.99 | 0.99 | 0.99 | 0.99 | 0.99 | 0.99 | 0.99 |
| 3.0 | 1.00 | 1.00 | 1.00 | 1.00 | 1.00 | 1.00 | 1.00 | 1.00 | 1.00 | 1.00 |
| 5.0 | 1.00 | 1.00 | 1.00 | 1.00 | 1.00 | 1.00 | 1.00 | 1.00 | 1.00 | 1.00 |

TABLE 5

Degrees of separation T(x) of non-woven fabric sample 5
as a function of the dust loading times t from 1 to 10 minutes;
pressure difference: 34 Pa

| Particle size [μm] | Degree of separation T(x) of the non-woven fabric filter after a dust loading time of 1 to 10 minutes | | | | | | | | | |
|---|---|---|---|---|---|---|---|---|---|---|
| | 1 | 2 | 3 | 4 | 5 | 6 | 7 | 8 | 9 | 10 |
| 0.3 | 0.95 | 0.95 | 0.94 | 0.93 | 0.93 | 0.92 | 0.91 | 0.91 | 0.91 | 0.91 |
| 0.5 | 0.96 | 0.96 | 0.96 | 0.96 | 0.95 | 0.95 | 0.94 | 0.94 | 0.94 | 0.93 |
| 1.0 | 0.98 | 0.97 | 0.97 | 0.97 | 0.97 | 0.96 | 0.96 | 0.96 | 0.96 | 0.96 |
| 3.0 | 0.99 | 0.99 | 0.99 | 0.99 | 1.00 | 0.99 | 0.99 | 0.99 | 0.99 | 0.99 |
| 5.0 | 1.00 | 1.00 | 1.00 | 0.98 | 1.00 | 1.00 | 1.00 | 1.00 | 1.00 | 1.00 |

TABLE 6

Degrees of separation T(x) of non-woven fabric sample 6
as a function of the dust loading times t from 1 to 10 minutes;
pressure difference: 36 Pa

| Particle size [μm] | Degree of separation T(x) of the non-woven fabric filter after a dust loading time of 1 to 10 minutes | | | | | | | | | |
|---|---|---|---|---|---|---|---|---|---|---|
| | 1 | 2 | 3 | 4 | 5 | 6 | 7 | 8 | 9 | 10 |
| 0.3 | 0.96 | 0.96 | 0.96 | 0.96 | 0.96 | 0.96 | 0.95 | 0.96 | 0.96 | 0.95 |
| 0.5 | 0.98 | 0.98 | 0.97 | 0.97 | 0.97 | 0.97 | 0.97 | 0.97 | 0.97 | 0.97 |
| 1.0 | 0.98 | 0.98 | 0.98 | 0.98 | 0.98 | 0.98 | 0.98 | 0.98 | 0.98 | 0.98 |
| 3.0 | 0.99 | 1.00 | 1.00 | 1.00 | 1.00 | 1.00 | 1.00 | 1.00 | 1.00 | 1.00 |
| 5.0 | 0.98 | 1.00 | 1.00 | 1.00 | 1.00 | 1.00 | 1.00 | 1.00 | 1.00 | 1.00 |

The measurement results presented in the tables show (comparison of Tables ¾ and ⅚) that non-woven fabrics of HMA fibers or polyester fibers which have been modified with a charge control agent ((R)COPY CHARGE NX VP 434 or (R)COPY BLUE 124) and are employed as dust filters in each case show a significantly better degree of separation (separation capacity) than the non-woven fabrics prepared from non-modified fibers.

The improvement in the degree of separation achieved by the modification is significantly greater with the HMA fibers than with the polyester fibers.

This shows that by the mixture according to the invention of HMA and polyester electret fibers, the degree of separation of a non-woven fabric can be increased considerably above the degree of separation of a non-woven fabric of polyester electret fibers. It is therefore possible to replace a considerable content of the HMA electret fibers in non-woven fabrics by inexpensive polyester electret fibers without having to accept losses in the degree of separation of the non-woven fabric.

What is claimed is:

1. A non-woven fabric of electret fibers having an improved charge stability and comprising materials which chiefly comprise a fiber-forming polymer obtained by polymerization or polycondensation, and 0.01 to 30% by weight based on the weight of the material, of organic or organometallic charge control agents, wherein the non-woven fabric comprises at least two types of electret fibers which are made of different materials and wherein these materials differ from one another in that they comprise different fiber-forming addition or condensation polymers.

2. A non-woven fabric of electret fibers as claimed in claim 1, wherein the materials comprise 0.01 to 10% by weight, based on the weight of the material, of organic or organometallic charge control agents.

3. A non-woven fabric of electret fibers as claimed in claim 1, wherein the materials comprise 0.1 to 5% by weight, based on the weight of the material, of organic or organometallic charge control agents.

4. A non-woven fabric of electret fibers as claimed in claim 1, wherein the non-woven fabric comprises two to three types of electret fibers which are made of different materials.

5. A non-woven fabric of electret fibers as claimed in claim 1, wherein the non-woven fabric comprises two types of electret fibers which are made of different materials.

6. A non-woven fabric of electret fibers as claimed in claim 1, wherein the different materials comprise different fiber-forming addition or condensation polymers.

7. A non-woven fabric of electret fibers as claimed in claim 1, wherein the different materials comprise different fiber-forming addition or condensation polymers which differ in respect of their dielectric constant.

8. A non-woven fabric of electret fibers as claimed in claim 1, wherein the different materials comprise different addition or condensation polymerization polymers which are chosen from the group consisting of polyolefins, halogenated polyolefins, polyacrylates, polyacrylonitrile, polystyrene and fluorine polymers, or from the group consisting of polyesters, polycarbonates, aliphatic or aromatic polyamids, polyimids, polyether ketones (for example PEK and PEEK), polyarylene sulfides, in particular polyphenylene sulfide, polyacetals and cellulose esters.

9. A non-woven fabric of electret fibers as claimed in claim 1, wherein the different materials comprise different fiber-forming addition or condensation polymers and different organic or organometallic charge control agents.

10. A non-woven fabric of electret fibers as claimed in claim 1, wherein the different materials comprise different organic or organometallic charge control agents which are chosen from the group consisting of triphenylmethanes; ammonium and immonium compounds; fluorinated ammonium and immonium compounds; bis-cationic acid amides; polymeric ammonium compounds; diallylammonium compounds; arylsulfide derivatives; phenol derivatives; phosphonium compounds and fluorinated phosphonium compounds; calix(n)arenes; metal complex compounds; benzimidazolones; and azines, thiazines or oxazines which are listed in the Color Index as Pigments, Solvent Dyes, Basic Dyes or Acid Dyes.

11. A non-woven fabric of electret fibers as claimed in claim 1, which has been consolidated.

12. A non-woven fabric of electret fibers as claimed in claim 1, which has been consolidated mechanically.

13. A non-woven fabric of electret fibers as claimed in claim 1, which has been consolidated by a chemical binder.

14. A non-woven fabric of electret fibers as claimed in claim 1, which has been consolidated by a fusible binder.

15. A dust filter made of or comprising a non-woven fabric as claimed in claim 1.

16. A dust cloth made of or comprising a non-woven fabric as claimed in claim 1.

\* \* \* \* \*